United States Patent [19]

Nagano

[11] Patent Number: 4,766,979

[45] Date of Patent: Aug. 30, 1988

[54] CALIPER BRAKE

[75] Inventor: Masashi Nagano, Izumi, Japan

[73] Assignee: Shimano Industrial Company Limited, Osaka, Japan

[21] Appl. No.: 86,396

[22] Filed: Aug. 17, 1987

[30] Foreign Application Priority Data

Aug. 20, 1986 [JP] Japan .................. 61-127475[U]

[51] Int. Cl.$^4$ .............................................. B62L 1/02
[52] U.S. Cl. ................................ 188/24.12; 188/24.19
[58] Field of Search ............... 188/24.12, 24.13, 24.14, 188/24.15, 24.16, 24.17, 24.18, 24.19, 216, 196 F, 196 R

[56] References Cited

U.S. PATENT DOCUMENTS 4,263,990  4/1981  Yoshigai ........................ 188/24.19
4,301,894  11/1981 Arai .................................. 188/24.19

FOREIGN PATENT DOCUMENTS 0420483  4/1948  Italy ............................... 188/24.12
794069   2/1936  France .
698136   10/1953 United Kingdom .
849229   11/1939 France .

Primary Examiner—Andres Kashnikow
Assistant Examiner—Mark T. Le
Attorney, Agent, or Firm—Stevens, Davis, Miller & Mosher

[57] ABSTRACT

A caliper brake which includes a fixing member, a pair of brake arms pivoted to the fixing member and each carrying a brake shoe, a return spring interposed between each of the brake arms and the fixing member, for biasing the brake arms to move them away from each other, with the return spring having spring legs respectively engageable with the brake arms, and a pair of inversion members which can be inverted to adjust the spring reaction force of the return spring. The inversion members each include a first contact portion and a second contact portion for making contact with a respective one of the brake arms. The inversion members include a fitting bore located at a position shifted from the center of the inversion member between the first and second contact portion, such that the fitting bore is closer to the first contact portion. The spring legs are respectively fitted in the fitting bores of the inversion members, whereby each of the inversion members is capable of being pivoted around the fitting bore so as to change its position between a first position at which the first contact portion makes contact with the brake arms and a second position where the second contact portion makes contact with the brake arms.

4 Claims, 2 Drawing Sheets

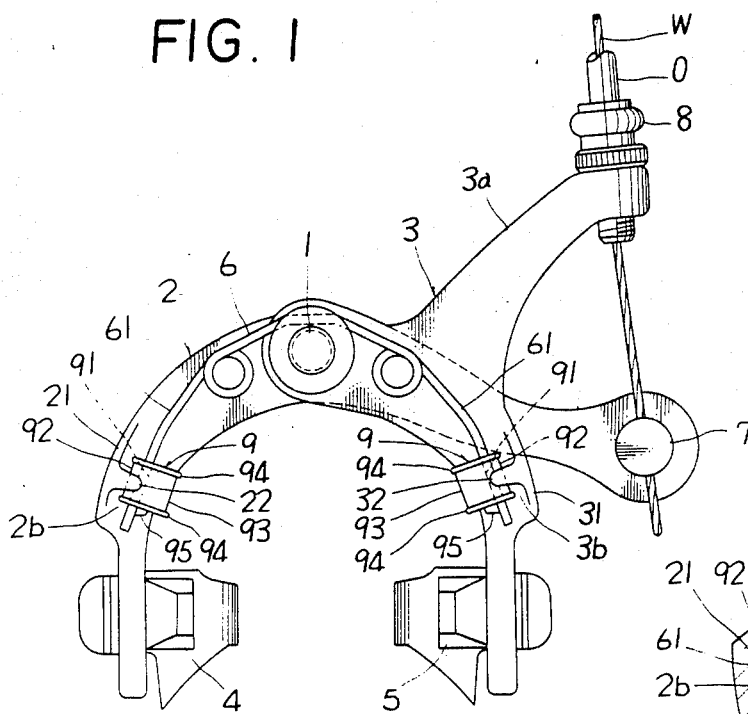
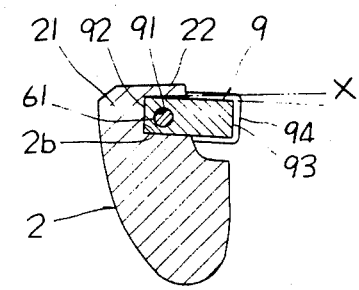
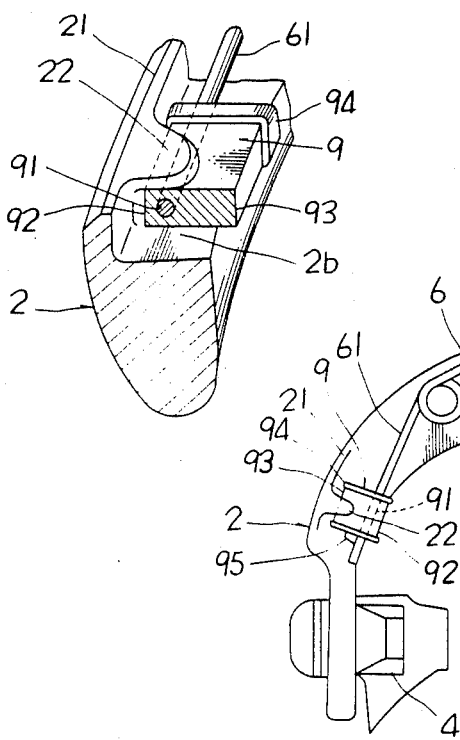
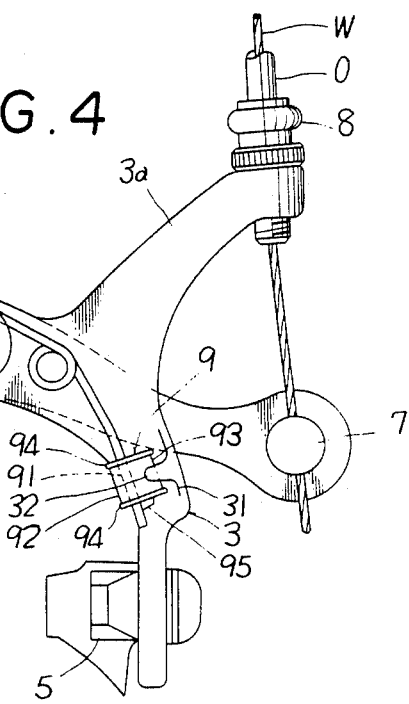

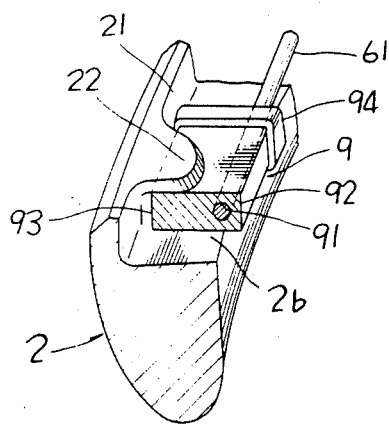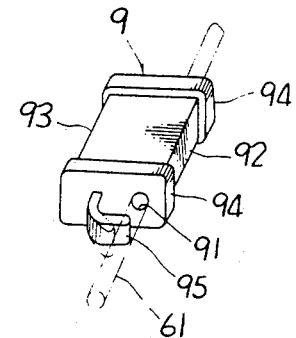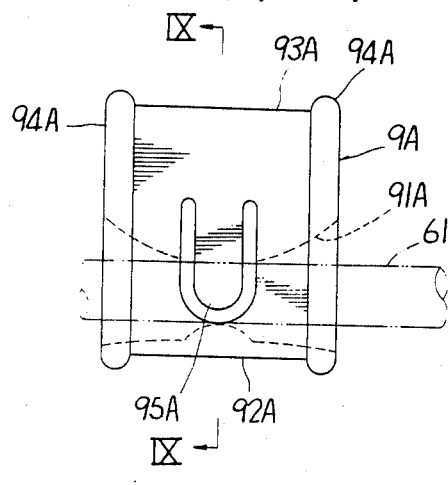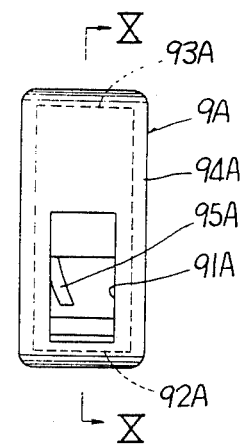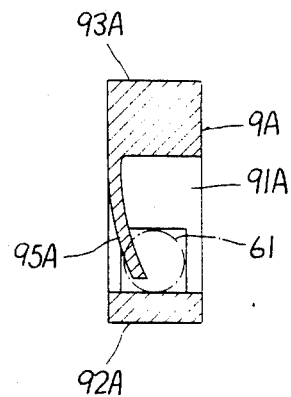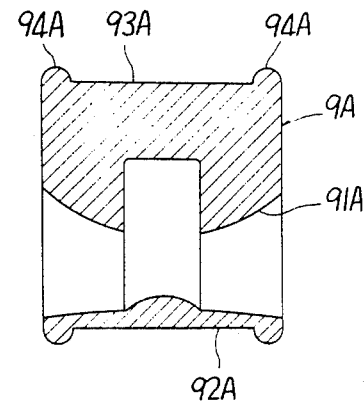

CALIPER BRAKE

FIELD OF THE INVENTION

The present invention relates to a caliper brake for a bicycle mounted typically to a front fork or a back fork of the bicycle frame.

BACKGROUND OF THE INVENTION

Generally, this kind of caliper brake, as disclosed in U.S. Pat. No. 4,263,990, has a pair of brake arms carrying brake shoes and pivotally supported to a fixing member provided with a pivot shaft fixed to the bicycle frame. A return spring is provided between the brake arms and the fixing member, for biasing the respective brake arms in the direction of moving the brake shoes away from each other. After a brake lever is released, the return spring restores each brake arm to its rest position, and the brake lever is returned from the operating position to the restoring position through a control wire connecting the brake arms and brake lever.

The present applicant has hitherto proposed a brake device which is provided at a brake operating device having a brake lever with a lever spring for biasing always the brake lever toward its restoration position. A restoring force of the return spring is always weakened so that even when a transmission efficiency of the control wire is deteriorated after long use, the brake lever is operated in a good return feeling while the braking action is exerted always in a light touch, thereby enabling a cyclist to steer the bicycle without anxiety.

A brake operating device provided with a lever spring, however, can weaken the restoring force of the return spring at the brake, but a brake having a return spring with a weak restoring force, when set with a brake lever having a lever spring, is not problematical. When the brake is used in combination with a usual brake lever having no lever spring, since the restoring force of the return spring at the brake is too weak, the brake lever may not reliably return to the restoration position.

SUMMARY OF THE INVENTION

An object of the invention is to provide a caliper brake which has a simply adjustable restoring force (spring reaction force) of a return spring at the brake even when combined with either a brake lever provided with a lever spring or a usual brake lever having no lever spring, thereby being usable without hindrance such as no restoration of the brake lever.

In a caliper brake provided with (1) a pair of brake arms carrying brake shoes and pivoted to a fixing member and (2) a return spring provided between the brake arms and the fixing member, for biasing the brake arms in the direction of moving the brake shoes away from each other, the present invention provides a pair of inversion members which are fitted onto a pair of legs or ends of the return spring, where the inversion members have a structure which enables them to be inverted in position to adjust the spring reaction force of the return spring.

The inversion members each have first and second contact portions in contact with the brake arms respectively and a fitting bore for receiving therein the spring leg. The fitting bore is shifted off-center toward the first contact portion with respect to the center between the first and second contact portions.

In other words, a distance between the first contact portion and the center of the fitting bore is smaller than that between the second contact portion and the fitting bore. Each inversion member can be inverted at an angle of 180° around the fitting bore, so that the inversion member can be changed between a first position where the first contact portion contacts with the brake arm and a second position where the second contact portion contacts with the brake arm.

Accordingly, the first and second contact portions are selected by the inversion of the inversion member to change the position of each spring leg of the return spring with respect to the brake arm, thereby enabling the spring reaction force of the return spring for the brake arm to be adjusted.

In a case where a caliper brake of a invention is combined with the brake lever having the lever spring, a weak restoring force (spring reaction force) of the return spring is acceptable and the brake lever is lightly operable for a rather weak restoring force. In this case, the inversion member is selected to be put at the first position where the first contact portion near the fitting bore is on contact with the brake arm.

In a case where the caliper brake is combined with a brake lever having no lever spring, the restoring force of the return spring must be intensified. In this case, the inversion member is selected to change from the first position to the second position where the second contact portion larger in distance from the fitting bore contacts with the brake arm.

Thus, the inversion member is simply inverted to change the restoring force (spring reaction force) of the return spring with ease without exchanging the return spring.

Accordingly, the caliper brake of the invention is widely applicable to that extent and increases general usage thereof, thereby enabling mass-production of the same kind of device with a low manufacturing cost.

The above and further objects and novel features of the invention will be more fully apparent from the following detailed description when the same is read in connection with the accompanying drawings.

BRIEF DESCRIPTION OF THE DRAWINGS

FIG. 1 is a rear view of an embodiment of a caliper brake of the invention,

FIG. 2 is a perspective view of the principal portion only of the FIG. 1 embodiment, FIG. 3 is a sectional view of the principal portion of FIG. 2, FIG. 4 is a rear view of the caliper brake corresponding to FIG. 1, in which an inversion member is inverted, FIG. 5 is a perspective view of the principal portion corresponding to FIG. 2, FIG. 6 is a perspective view of the inversion member only, FIG. 7 is an enlarged plan view of a modified embodiment of the caliper brake of the invention, FIG. 8 is a right-side view of the modified embodiment in FIG. 7, FIG. 9 is a sectional view taken along line IX—IX in FIG. 7, and FIG. 10 is a sectional view taken along line X—X.

DETAILED DESCRIPTION OF THE INVENTION

Referring to FIG. 1, a caliper brake is shown which pivotally supports a pair of brake arms each having at one end a brake shoe 4 or 5 to a fixing member provided with a pivot shaft fixed to, for example, a front fork at the bicycle A return spring 6 is provided between the brake arms 2 and 3 and the fixing member 1, for biasing the brake arms 2 and 3 in the direction of moving the brake shoes 4 and 5 away from each other. A fixture 7 for fixing one end of a control wire W is mounted on the free end of one brake arm 2, and a holder 8 for an outer sheath O for guiding the control wire W is mounted on an arm provided at an intermediate portion of the other brake arm 3. Fixture 7 and support 8 are vertically opposite to each other, so that the wire W is pulled to swing the brake arms 2 and 3 against a restoring force of the return spring to thereby exert the braking action.

The embodiment shown in FIGS. 1 through 6 include a pair of inversion members 9 having fitting bores 91 engageable with spring legs 61 of the return spring 6 at the brake arms 2 and 3. Inversion members 4 are formed and mounted on the spring legs 61 fitted into the fitting bores 91 such that they are invertible around the respective spring legs 61. The brake arms 2 and 3 are provided with stoppers 21 and 31 for stopping the inversion members 9 respectively.

The inversion members 9, as seen in FIG. 6, are each formed in a rectangular parallelepiped shape and one side surface with respect to the fitting bore 91 is formed in a first contact portion 92 and the other side surface with respect to the fitting bore 91 is formed in a second contact portion 93 with respect to the respective brake arms 2 and 3.

The fitting bore 91 is shifted in position to be closer to first contact portion 92 relative to the center of member 91 than to second contact portion 93, whereby a distance between the first contact portion 92 and the fitting bore 91 is smaller than that between the second contact portion 93 and fitting bore 91.

Also, the inversion members 9 can be inverted around the fitting bores 91 respectively so as to change their orientations from a first position where the first contact portions 92 are in contact with the stoppers 21 and 31 at the brake arms 2 and 3 to a second position where the second contact portions 93 are in contact with the stoppers 21 and 31 at the braking arms 2 and 3 or vice versa, thereby enabling the spring reaction force of the return spring to be adjusted so that it is weak at the first position and strong at the second position. In addition, the return spring 6 shown in the drawing uses a single elastic wire whose center is retained to the fixing member 1, and a pair of spring legs 61 extend from the center and are coiled in an intermediate region thereof respectively. When the inversion members 9 are put in the first positions as shown in FIGS. 1 through 3, the spring reaction force of the return spring 6 is, for example, about 800 g of the minimum requirement value of a spring force when the caliper brake is combined with a brake lever having a lever spring. When the inversion members 9 are put in the second positions as shown in FIGS. 4 and 5, the spring reaction force is equal to a spring force required for the caliper brake combined with a brake lever having no lever spring.

The stoppers 21 and 31 are formed by raising the brake shoe holding sides of the brake arms 2 and 3 respectively and are provided with holders 22 and 32 opposite to the surfaces of the brake arms 2 and 3 at predetermined intervals so that the inversion members 9 are held between the holders 22 and 32 and the brake arms 2 and 3 respectively. Also, each inversion member 9, as shown in FIG. 6, is provided at both lengthwise ends with swollen portions 94 engageable with side edges of the holders 22 and 32 to prevent the inversion member 9 from falling down from each brake arm 2 or 3.

The surfaces 2b and 3b of the brake arms 2 and 3 opposite to the holders 22 and 32 are inclined with respect to the reference horizontal plane X as shown in FIG. 3, whereby it is difficult for inversion members 9 to escape from between the holders 22 and 32 and the surfaces 2b and 3b.

Each inversion member 9 is provided at its end face located at a side of the utmost end of spring leg 61 with an elastically deformable resistance piece 95 facing the fitting bore 91, so that when the spring leg 61 is fitted therein, the resistance piece 95 is elastically deformed to contact with the periphery of the spring leg 61, thereby preventing the inversion member 9 from escaping from the spring leg 61.

In a case where the caliper brake of the invention constructed as described above is used in combination with, for example, a brake lever provided with a lever spring, the first contact portions 92 of the inversion members 9 fitted onto the spring legs 61 of the return spring 6 are brought into contact with the stoppers 21 and 31 at the brake arms 2 and 3 respectively, so that the inversion members 9 are disposed in the first positions where the restoring force of the return spring 6 is weak. In this case, an operating force required for accomplishing the braking action can be reduced because of the weak restoring force of the return spring 6, so that, even when the transmission efficiency of the control wire W decreases, the light braking action is always exerted and a good return feeling of the brake lever is obtainable.

The inversion members 9 are held between the holders 22 and 32 and the surfaces 2b and 3b oposite thereto and inclined with respect to the horizontal plane X parallel to the direction of restoration of the return spring 6. As a result, although the restoring force of the return spring 6 is weak, the inversion members 9 are reliably prevented from escaping from the stoppers 21 and 31.

In a case where the caliper brake of the invention is used in combination with a usual brake lever having no lever spring, the inversion members 9 are released from contact with the stoppers 21 and 31 and inverted around the spring legs 61 without being removed therefrom, so that the second contact portions 93 at the inversion members 9 are brought into contact with the stoppers 21 and 31 and the return spring 6 is changed over to the second position where the restoring force of the return spring 6 is intensified with respect to the brake arms 2 and 3. In this case, since the restoring force of the return spring 6 is intensified, even when the transmission efficiency of the control wire W is deteriorated, the brake lever can reliably be restored.

It should be noted that, the inversion members 9 are simply inverted without being removed from the spring legs 61, thereby enabling the spring legs 61 to be changed in position with respect to the brake arms 2 and 3.

Since the resistance pieces 95 provided at the inversion members 9 contact with the outer peripheral surfaces of the spring legs 61 to give resistance against movement of the inversion members 9 make with respect to the spring legs 61, when spring legs 61 are changed in position with respect to the brake arms 2 and 3, the inversion members 9 can be prevented from escaping from the spring legs 61, thereby being inverted with ease.

As seen from the above, since the inversion members 9 are inverted to thereby switch the restoring force of return spring 6 into two steps, a difference between the restoring forces of the return spring can be set to increase.

Alternatively, the resistance pieces 95 may, as shown in FIGS. 7 through 10, be provided at intermediate portions of the inversion members 9 respectively.

Each inversion member 9A shown in FIGS. 7 through 10 has a curved fitting bore 91A as shown in FIG. 10 and at a lengthwise intermediate portion of the fitting bore 91A is provided a resistance piece 95A in elastic contact with the spring leg 61 to be fitted into the fitting bore 91A. In addition, each inversion member 9A of course has a first contact portion 92A, a second contact portion 93A and swollen portions 94A the same as in the aforesaid embodiment.

Alternatively, the return spring 6 may be provided separately corresponding to each brake arm 2 or 3.

Also, in a case where the caliper brake of the invention is used in combination with a usual brake lever having no lever spring, the restoring force of the return spring 6 may be weakened for a good transmission efficiency of the control wire W and the same may be intensified for a poor transmission efficiency.

The caliper brake of the invention may be applicable to a center-pull type caliper brake or a cantilever type caliper brake other than the aforesaid side-pull type caliper brake.

As seen from the above, the caliper brake of the invention constructed as abovementioned, can change each inversion member 9 from the first position where the restoring force of the return spring 6 is weak to the second position where the same is intensified or vice versa, thereby being useable without hindrance even when in combination with either a brake lever having the lever spring or a brake lever having no lever spring.

Moreover, the inversion members 9 each having first and second contact portions are easily inverted, without removing the inversion members from the spring legs 61 of the return spring, to shift the spring legs 61 with respect to the brake arms 2 and 3 respectively.

Although several embodiments have been described, they are merely exemplary of the invention and not to be construed as limiting, the invention being defined solely by the appended claims.

What is claimed is:

1. A caliper brake comprising:
   a fixing member;
   a pair of brake arms pivoted to said fixing member and each carrying a brake shoe,
   a return spring interposed between each of said brake arms and said fixing member, for biasing said brake arms in a direction of moving said brake shoes away from each other, said return spring having spring legs respectively engageable with said brake arms and
   inversion members each comprising a first contact portion and a second contact portion for contacting with respective said brake arms and a fitting bore located at a position shifted from a center thereof between said first contact portion and said second contact portion closer to said first contact portion,
   said spring legs being respectively fitted in the fitting bores of said inversion members, whereby each of said inversion members is capable of being pivoted around said fitting bore so as to change its position between a first position where said first contact portion makes contact with one of said brake arms and a second position where said second contact portion makes contact with one of said brake arms, such that said inversion members are inverted to adjust a spring reaction force of said return spring.

2. A caliper brake according to claim 1, wherein said brake arms have stoppers for stopping said inversion members, said stoppers comprising holders spaced apart from opposite surfaces of said brake arms and said inversion members being held between said holders and said opposite surfaces of said brake arms.

3. A caliper brake according to claim 2, wherein said inversion members each have at both lengthwise sides of said contact portions swollen portions engageable with side edges of each of said holders to prevent said inversion members from escaping from said brake arms.

4. A caliper brake according to claim 1, wherein each of said inversion members is provided with a resistance member in contact with said spring leg fitted into said fitting bore to apply resistance against movement of said spring leg with respect to said inversion member.

* * * * *